(12) United States Patent
Rezk et al.

(10) Patent No.: US 10,775,508 B1
(45) Date of Patent: Sep. 15, 2020

(54) REMOTE SENSING DEVICE

(71) Applicant: Apple Inc., Cupertino, CA (US)

(72) Inventors: Mina A. Rezk, Los Gatos, CA (US); Alexander Shpunt, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 497 days.

(21) Appl. No.: 15/680,015

(22) Filed: Aug. 17, 2017

Related U.S. Application Data

(60) Provisional application No. 62/377,404, filed on Aug. 19, 2016.

(51) Int. Cl.
| | |
|---|---|
| *G01S 17/00* | (2020.01) |
| *G01S 17/89* | (2020.01) |
| *G01S 17/08* | (2006.01) |
| *G01S 7/481* | (2006.01) |

(52) U.S. Cl.
CPC .......... *G01S 17/89* (2013.01); *G01S 7/4816* (2013.01); *G01S 7/4817* (2013.01); *G01S 17/08* (2013.01)

(58) Field of Classification Search
USPC ....................................................... 356/4.01
See application file for complete search history.

(56) References Cited

U.S. PATENT DOCUMENTS

| | | | | |
|---|---|---|---|---|
| 7,479,966 | B2* | 1/2009 | Maier | G06T 5/50 345/426 |
| 2002/0088952 | A1* | 7/2002 | Rao | G01N 21/9501 250/559.45 |
| 2003/0193589 | A1* | 10/2003 | Lareau | H04N 3/1525 348/294 |
| 2004/0012775 | A1* | 1/2004 | Kinney | G01N 21/9501 356/237.2 |
| 2005/0163365 | A1* | 7/2005 | Barbour | G01B 11/24 382/154 |
| 2006/0253035 | A1* | 11/2006 | Stern | G01N 21/6428 600/476 |
| 2007/0274714 | A1* | 11/2007 | Achal | G01J 3/02 398/43 |
| 2008/0218851 | A1* | 9/2008 | Chen | G02B 23/12 359/419 |
| 2009/0021730 | A1* | 1/2009 | Maier | G06T 5/50 356/301 |
| 2009/0096783 | A1* | 4/2009 | Shpunt | G01B 11/25 345/419 |
| 2011/0038507 | A1* | 2/2011 | Hager | G01N 21/33 382/100 |

(Continued)

*Primary Examiner* — James R Hulka
(74) *Attorney, Agent, or Firm* — Robert C. Kowert; Kowert, Hood, Munyon, Rankin & Goetzel, P.C.

(57) ABSTRACT

A compact remote sensing device is described that includes a transmit component that scans a beam of light across a scene or object field, and a receive component that receives return light from the object field. The transmit component includes a small, fast scanning mechanism such as a MEMS mirror or a piezo mirror that scans a beam of light emitted by a light source across a field of view (FOV). The receive component includes a focal plane array (FPA) with a FOV at least large enough to capture the FOV of the scanning mechanism. The FPA may be a low resolution FPA (i.e., with fewer pixels than the resolution of the scanning mechanism), and the light beam may be scanned and captured at multiple spots within the pixels of the FPA.

23 Claims, 11 Drawing Sheets

(56) References Cited

U.S. PATENT DOCUMENTS

| | | | |
|---|---|---|---|
| 2011/0085219 A1* | 4/2011 | Yang | G02B 5/32 |
| | | | 359/15 |
| 2011/0285995 A1* | 11/2011 | Tkaczyk | G01J 3/02 |
| | | | 356/326 |
| 2011/0299763 A1* | 12/2011 | Barbour | G01B 11/24 |
| | | | 382/154 |
| 2012/0112038 A1* | 5/2012 | Hamoir | H04N 5/2256 |
| | | | 250/208.1 |
| 2012/0268745 A1* | 10/2012 | Kudenov | G01J 3/447 |
| | | | 356/453 |
| 2014/0320843 A1* | 10/2014 | Streuber | F41G 7/008 |
| | | | 356/4.01 |
| 2014/0350836 A1* | 11/2014 | Stettner | B60W 30/08 |
| | | | 701/301 |
| 2015/0268345 A1* | 9/2015 | Ell | F41G 7/008 |
| | | | 356/5.01 |
| 2016/0045291 A1* | 2/2016 | Verker | G02B 23/2461 |
| | | | 356/364 |

\* cited by examiner (No angular magnification)

(Angular magnification)

REMOTE SENSING DEVICE

This application claims benefit of priority to U.S. Provisional Application No. 62/377,404, filed Aug. 19, 2016, titled "Remote Sensing Device", which is hereby incorporated by reference in its entirety.

BACKGROUND

Technical Field

This disclosure relates generally to remote sensing systems, and more specifically to compact remote sensing systems.

Description of the Related Art

Conventional scanning systems (e.g., LiDAR systems) are typically bulky and large in size. These conventional scanning systems typically include a large scanning mechanism and a high resolution focal plane array (FPA) with enough pixels to support the resolution of the scanning mechanism. Both angular (XY) and depth (Z) position may be determined from the detector array.

SUMMARY OF EMBODIMENTS

Embodiments of the present disclosure may provide a compact remote sensing device that includes a transmit component that scans a beam of light across a scene or object field, and a receive component that receives return light from the object field. The transmit component includes a small, fast scanning mechanism, for example a MEMS (microelectromechanical system) mirror or mirror array, or a piezoelectric steering mirror (referred to as a piezo mirror), that scans a beam of light emitted by a light source across a field of view (FOV). The receive component includes a focal plane array (FPA) with a FOV at least large enough to capture the FOV of the scanning mechanism. The FPA may be a low resolution FPA (i.e., with fewer pixels than the resolution of the scanning mechanism), and the light beam may be scanned and captured at multiple spots (or subpixels) within the pixels of the FPA. The FPA may be implemented according to avalanche photodiode (APD) technology, PIN diode technology, or any other suitable technology.

In some embodiments, angular (XY) position may be determined from feedback of the scanning mechanism, and depth or range (Z) position may be determined from feedback of the detector array. The angular and depth position information may be processed to generate 3D imaging data output.

Some embodiments may also include an optical shutter located in the optical receiver path that acts to block unwanted light. Some embodiments may instead or also include an optical band-pass filter on the optical receiver path to attenuate or reject light outside of a range of the beam.

Some embodiments may include a polygon rotating mirror with N facets (e.g., five facets, six facets, etc.), each facet with a different facet angle, that may be used to increase the vertical FOV of the scanning mechanism. In these embodiments, the horizontal component of the scan may be provided by the rotating mirror.

Embodiments of the remote sensing device may, for example, be implemented as compact LiDAR modules. Embodiments may be implemented as small form factor, compact modules that may be integrated into small, tight spaces. Embodiments may provide high resolution 3D imaging without the need of a high resolution FPA and its corresponding digital receiver chain. Embodiments may provide high resolution 3D imaging and remote sensing capabilities at lower power than conventional systems that use higher-resolution FPAs. Further, embodiments may be less sensitive to vibrations than conventional systems due to the relatively small size of the scanning mechanism.

Figure 1A:
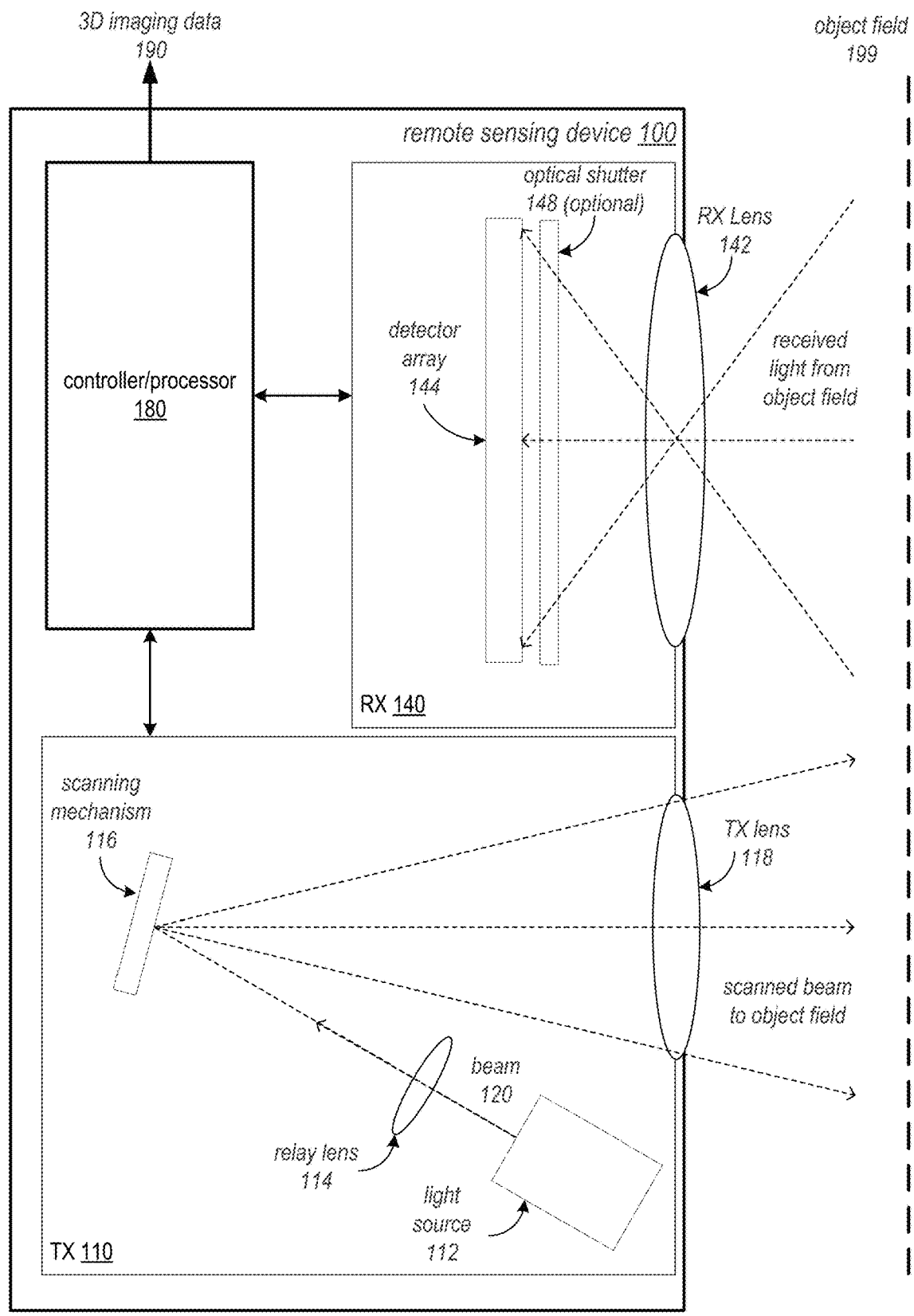
FIG. 1A is a block diagram illustrating components of a remote sensing device, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of a compact remote sensing device are described. The remote sensing device may include a transmit component that scans a beam of light across a scene or object field, and a receive component that receives return light from the object field. The transmit (TX) component includes a light source (e.g., one or more lasers) and a small, fast scanning mechanism, for example a MEMS (microelectromechanical system) mirror or mirror array, or a piezoelectric steering mirror (referred to as a piezo mirror), that scans a beam of light emitted by the light source across a field of view (FOV) at the object field. The receive (RX) component includes a focal plane array (FPA) with a FOV at least large enough to capture the FOV of the scanning mechanism. The FPA may be referred to herein as a detector array. However, instead of a high resolution FPA as used in conventional scanning systems, a lower resolution FPA (i.e., with fewer pixels than the resolution of the scanning mechanism) may be used, and the light beam may be scanned and captured at multiple spots (or sub-pixels) within the pixels of the FPA.

In some embodiments of the remote sensing device, angular (XY) position may be determined from feedback of the scanning mechanism, and depth or range (Z) position may be determined from feedback of the detector array. The angular and depth position information may be processed by a controller/processor component of the remote sensing system to generate three-dimensional (3D) imaging data output.

Embodiments of the remote sensing device may, for example, be implemented as compact LiDAR modules. Embodiments may be implemented as small form factor, compact modules that may be integrated into small, tight spaces. Embodiments may provide high resolution 3D imaging without the need of a high resolution FPA and its corresponding digital receiver chain. Embodiments may provide high resolution 3D imaging and remote sensing capabilities using lower-resolution FPAs that operate at lower power than conventional systems that use higher-resolution FPAs that require more power. Further, embodiments may be less sensitive to vibrations than conventional systems due to the relatively small size of the scanning mechanism.

FIG. 1A is a block diagram illustrating components of a remote sensing device 100, according to at least some embodiments. The remote sensing device 100 may include, but is not limited to, a transmit (TX) 110 component or module and a receive (RX) 140 component or module. In some embodiments, TX 110 may also include a controller/processor 180 component or module. TX 110 may include, but is not limited to, a light source 112 and a scanning mechanism 116. TX 110 may also include a relay lens 114 and a TX lens 118. RX 140 may include, but is not limited to, an RX lens 142 and a detector array 144. In some embodiments, the detector array 144 may be a solid-state detector that is fixed and does not move during operation. In some embodiments, RX 140 may also include an optical shutter 148 located in the optical receiver path between the RX lens 142 and the detector array 144 at or near the object field side surface of the detector array 144 that acts to block unwanted light. While not shown, in some embodiments, an optical filter (e.g., a band-pass filter) may instead or also be included on the optical receiver path between the RX lens 142 and the detector array 144 to attenuate or reject light outside of an electromagnetic (EM) spectral range of the beam.

Light source 112 may, for example, be a laser that emits a collimated, narrow beam 120. In some embodiments, multiple lasers with different attack angles may be used to increase the scanning mechanism 116 FOV without impacting the scanner's mechanical motion. In some embodiments, other light emitting technologies may be used, for example infrared (IR) light emitting mechanisms.

Relay lens 114 may include one or more refractive lens elements, and may act to refract light (beam 120) emitted by the light source 112 on the optical path to the scanning mechanism 116.

Scanning mechanism 116 may be or may include a small, fast scanning mechanism such as a MEMS (microelectromechanical system) mirror or mirror array or a piezo mirror that scans the collimated, narrow beam 120 of light emitted by the light source 112 across a field of view (FOV) at the object field 199. In at least some embodiments, the scanning mechanism 116 is sized to support beam divergence; as a non-limiting example, the scanning mechanism 116 may include a 6 mm scanning mirror.

Figure 4A:
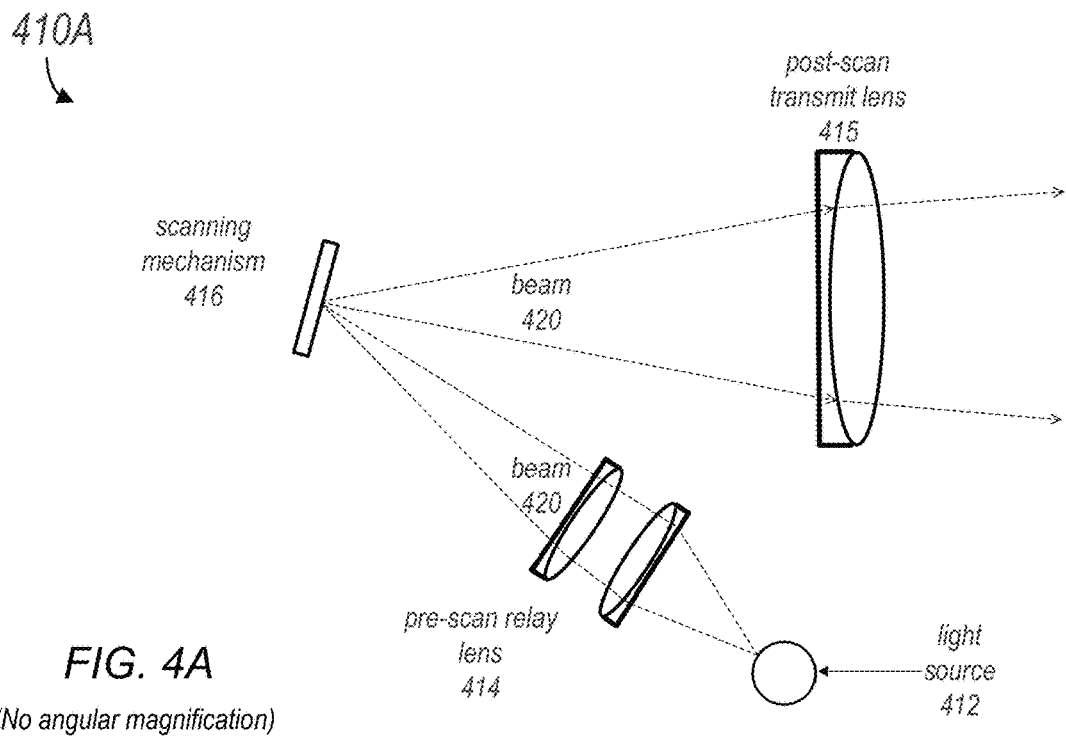
FIG. 4A illustrates an example transmit (TX) module of a remote sensing device, according to some embodiments.
Figure 4B:
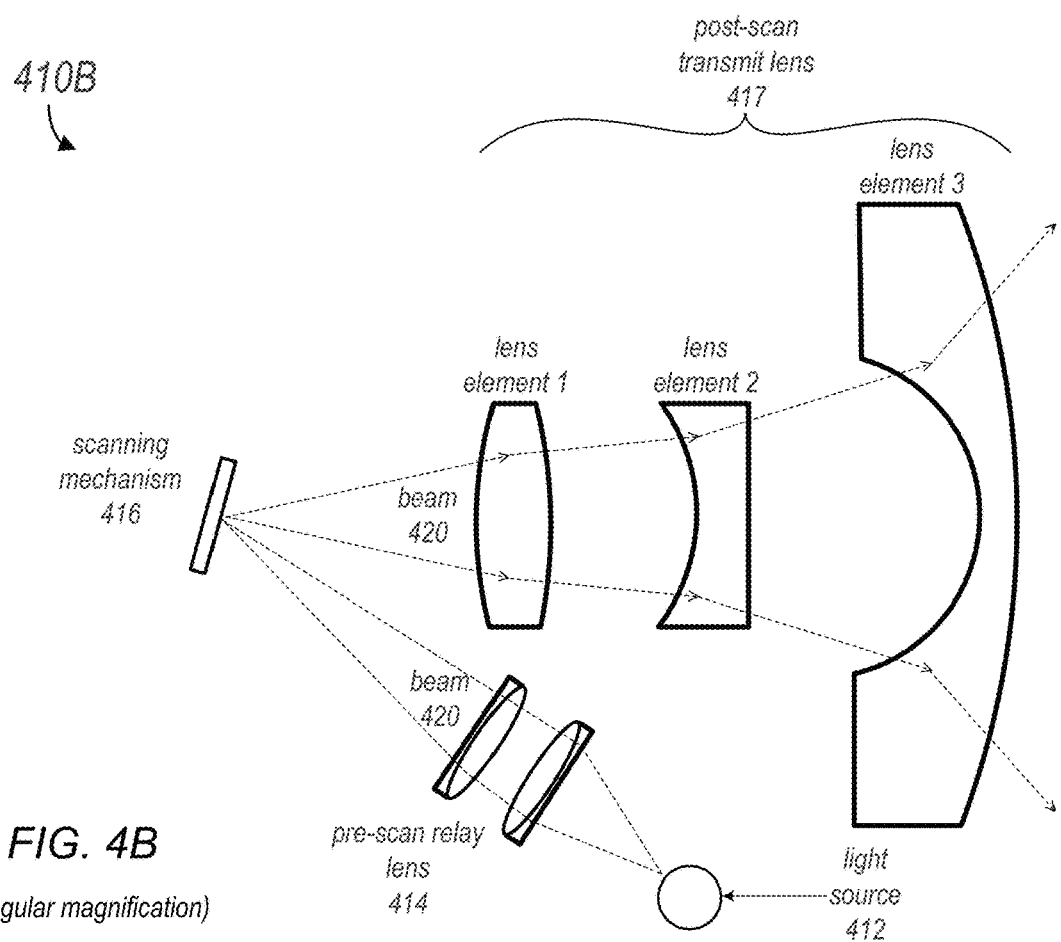
FIG. 4B illustrates an example TX module of a remote sensing device that provides angular magnification, according to some embodiments.

TX lens 118 may include one or more refractive lens elements, and may act to refract light (scanned beam 120) from the scanning mechanism 116 on the optical path to the object field 199. FIGS. 4A and 4B show example embodiments of TX lenses, one which does not provide angular magnification for the scanned beam 120, and one which does provide angular magnification for the scanned beam 120 to increase the FOV of the scanning mechanism 116.

RX lens 142 may include one or more refractive lens elements, and may act to collect and refract light (scanned beam 120) received from the object field 199 on the optical path to the detector array 144.

Figure 1B:
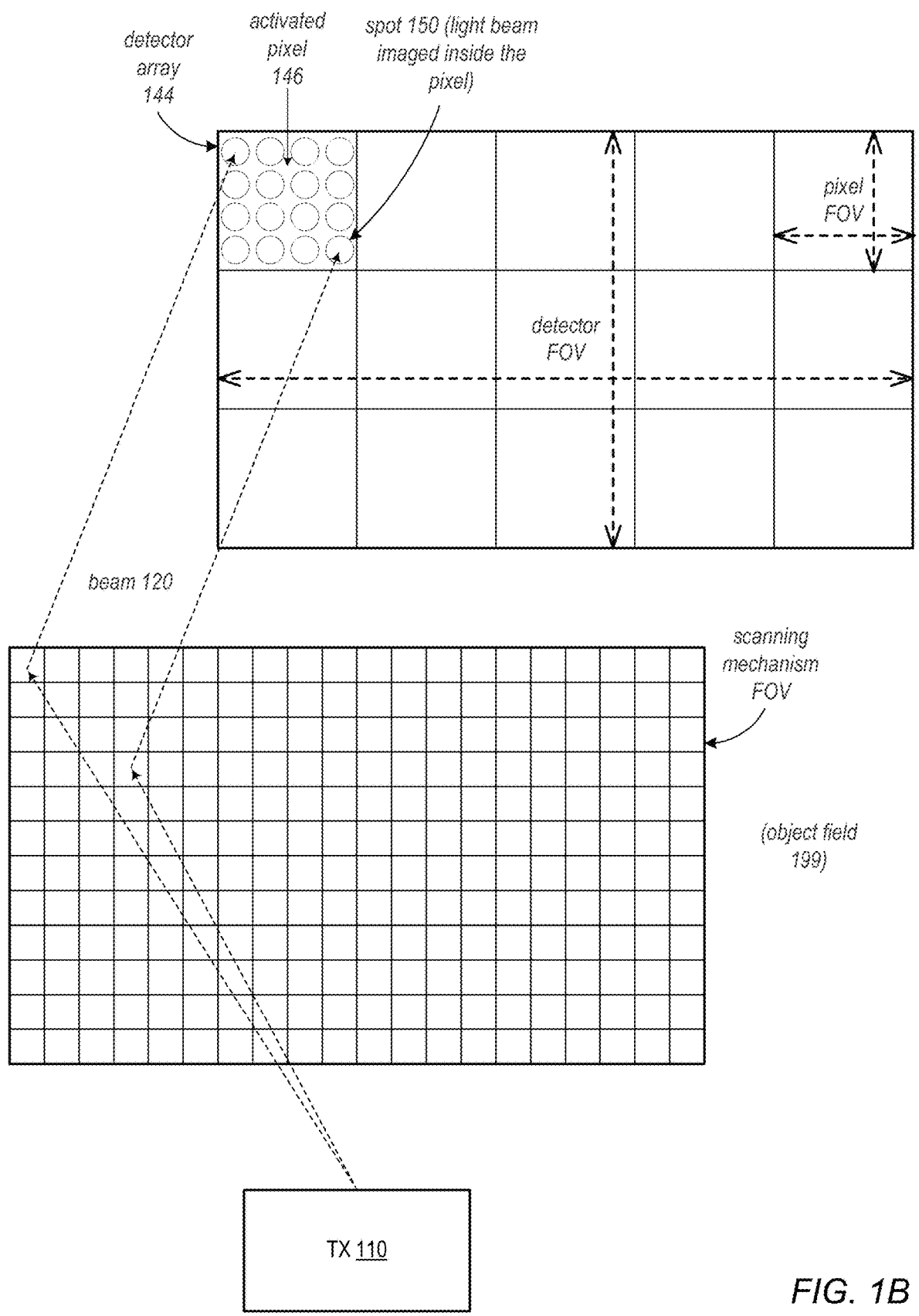
FIG. 1B illustrates a detector array of a remote sensing device, according to at least some embodiments.

Detector array 144 may be selected to provide a FOV at least large enough to capture the full FOV of the scanning mechanism 116. FIG. 1B illustrates a detector array 144 of a remote sensing device 100 as illustrated in FIG. 1, according to at least some embodiments. In some embodiments, the detector array 144 may be a solid-state detector that is fixed within RX 140 and that does not move during operation. As shown in FIG. 1B, the detector array 144 may be relatively low resolution when compared to the scanning mechanism 116 of TX 110, with fewer pixels than the resolution of the scanning mechanism 116. Each pixel FOV (PFOV) may be significantly larger than the size of the beam 120 received at the detector array 144. As a non-limiting example, pixel size may be 1 mm×1 mm, and beam size (diameter) may be 0.5 mm or less. The beam 120 may be scanned and captured at multiple spots 150 (or sub-pixels) within the pixels of the detector array 144. Pixels on the detector array 144 may be activated (or deactivated) according to the current scan angle of the beam 120. For example, FIG. 1B shows an activated pixel 146 when imaging the spots 150 indicated by the circles. Detector array 144 may, for example, be implemented according to avalanche photodiode (APD) technology, PIN diode technology, or any other suitable technology.

Figure 1C:
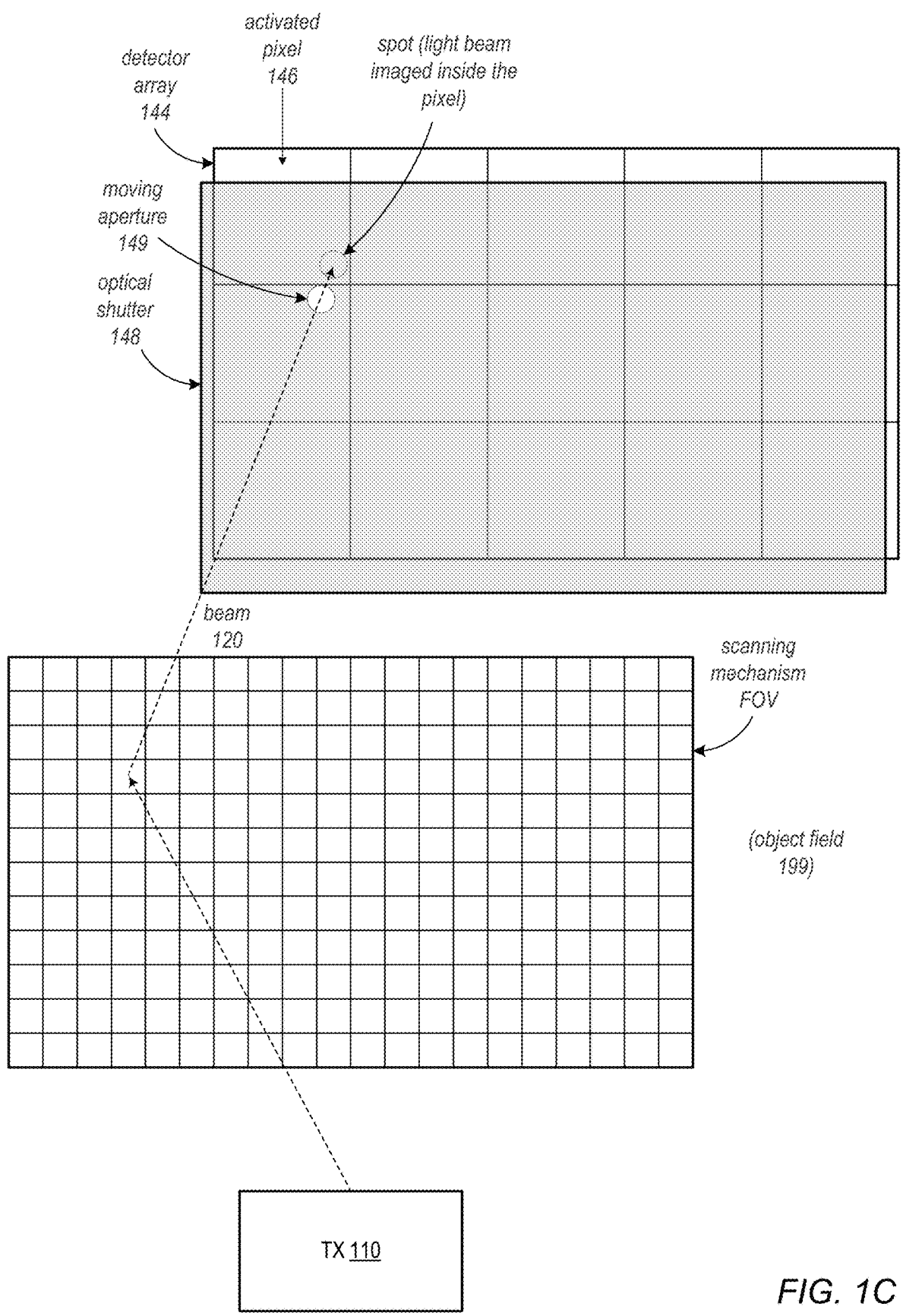
FIG. 1C illustrates an optical shutter in front of a detector array of a remote sensing device, according to some embodiments.

In some embodiments, RX 140 may also include an optical shutter 148 located at or near the object field side surface of the detector array 144 and in the optical path of the receiver 140 between the RX lens 142 and the detector array 144. FIG. 1C illustrates an optical shutter in front of a detector array of a remote sensing device 100 as illustrated in FIG. 1, according to some embodiments. The optical shutter 148 may act to block unwanted noise (e.g., unwanted light such as ambient solar light) from the spots 150 on the pixels when scanning the beam 120 over the FOV. In some embodiments, the optical shutter 148 may provide a moving aperture 149 of substantially the same size as the beam 120/spot 150 that moves according to the scan pattern of the beam 120. The optical shutter 148 may, for example, be implemented by liquid crystal technology at or on the object-side surface of the detector array 144. Other technologies may be used to implement an optical shutter 148 in some embodiments.

While not shown in FIGS. 1A-1C, in some embodiments, an optical band-pass filter may instead or also be included on the optical receiver path between the RX lens 142 and the detector array 144 to attenuate or reject light outside of a range of the beam.

Figure 1D:
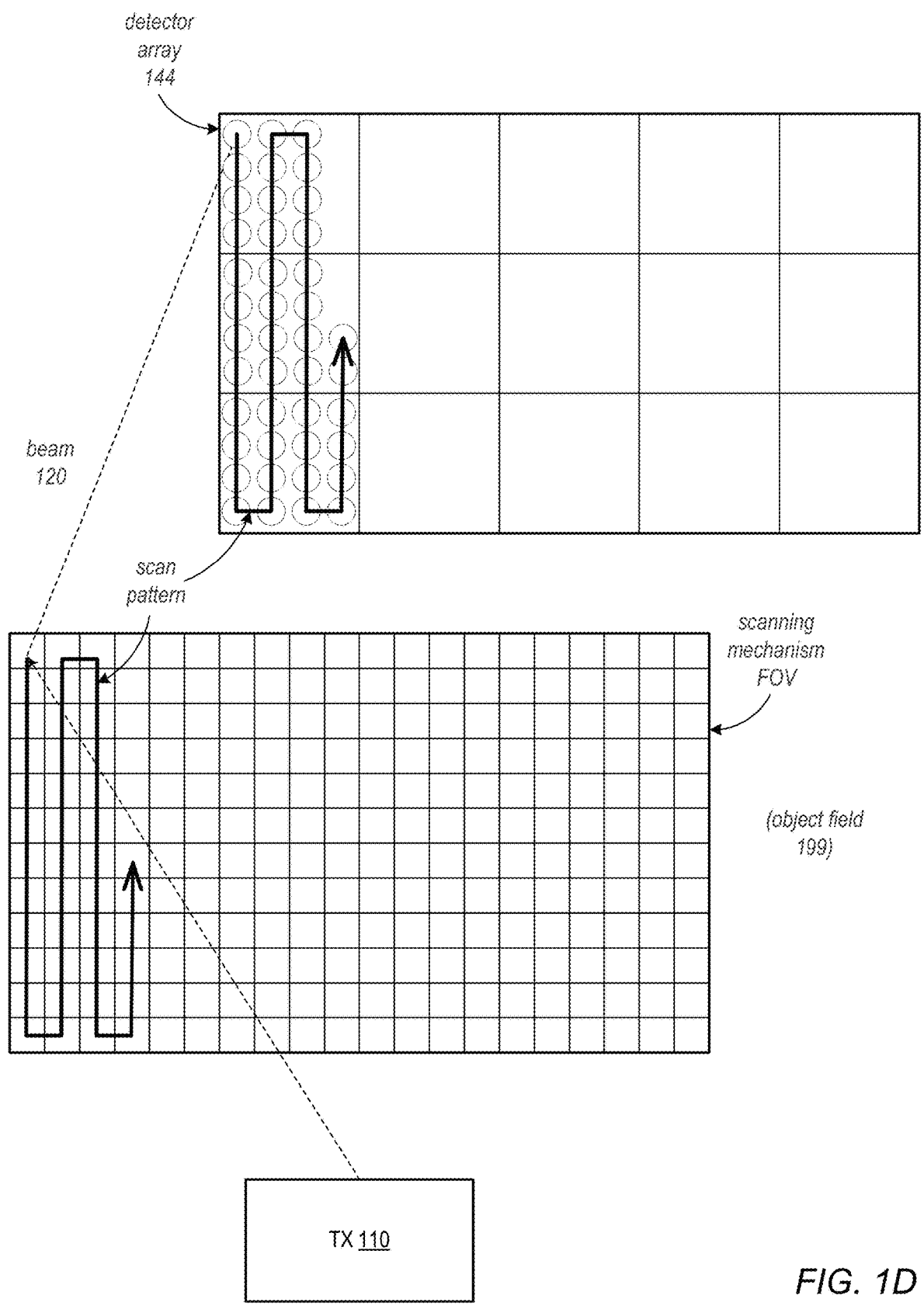
FIG. 1D illustrates an example scan pattern for a remote sensing device, according to some embodiments.

FIG. 1D illustrates an example, non-limiting scan pattern for a remote sensing device 100 as illustrated in FIGS. 1A through 1C, according to some embodiments. A scene (the object field 199) is scanned according to a pattern with a collimated, narrow beam 120 emitted from TX 110 of the remote sensing device 100. The beam 120 strikes objects/surfaces in the object field 199 and is returned to the RX 140, where the return beam scans across the object-side surface of the detector array 144. Pixels of the detector array are activated according to the current scan angle of the beam 120. The beam 120 may be scanned and captured at multiple spots 150 (or sub-pixels) within each pixel of the detector array 144. Note that the scan pattern shown in FIG. 1D is given by way of example; other scan patterns may be used.

As shown in FIG. 1A, in some embodiments, TX 110 may also include a controller/processor 180 component or module. Controller/processor 180 may act to control and synchronize operations of TX 110 and RX 140, may collect data from TX 100 and RX 140, and may process the collected data to generate 3D imaging data 190. In some embodiments, controller/processor 180 may determine angular (XY) position from feedback of the scanning mechanism 116 (e.g., current scan angle), and may determine depth or range (Z) position from feedback from currently activated pixels of the detector array 144. The angular and depth position information may be processed by controller/processor 180 to generate 3D imaging data 190 as output.

Figure 2:
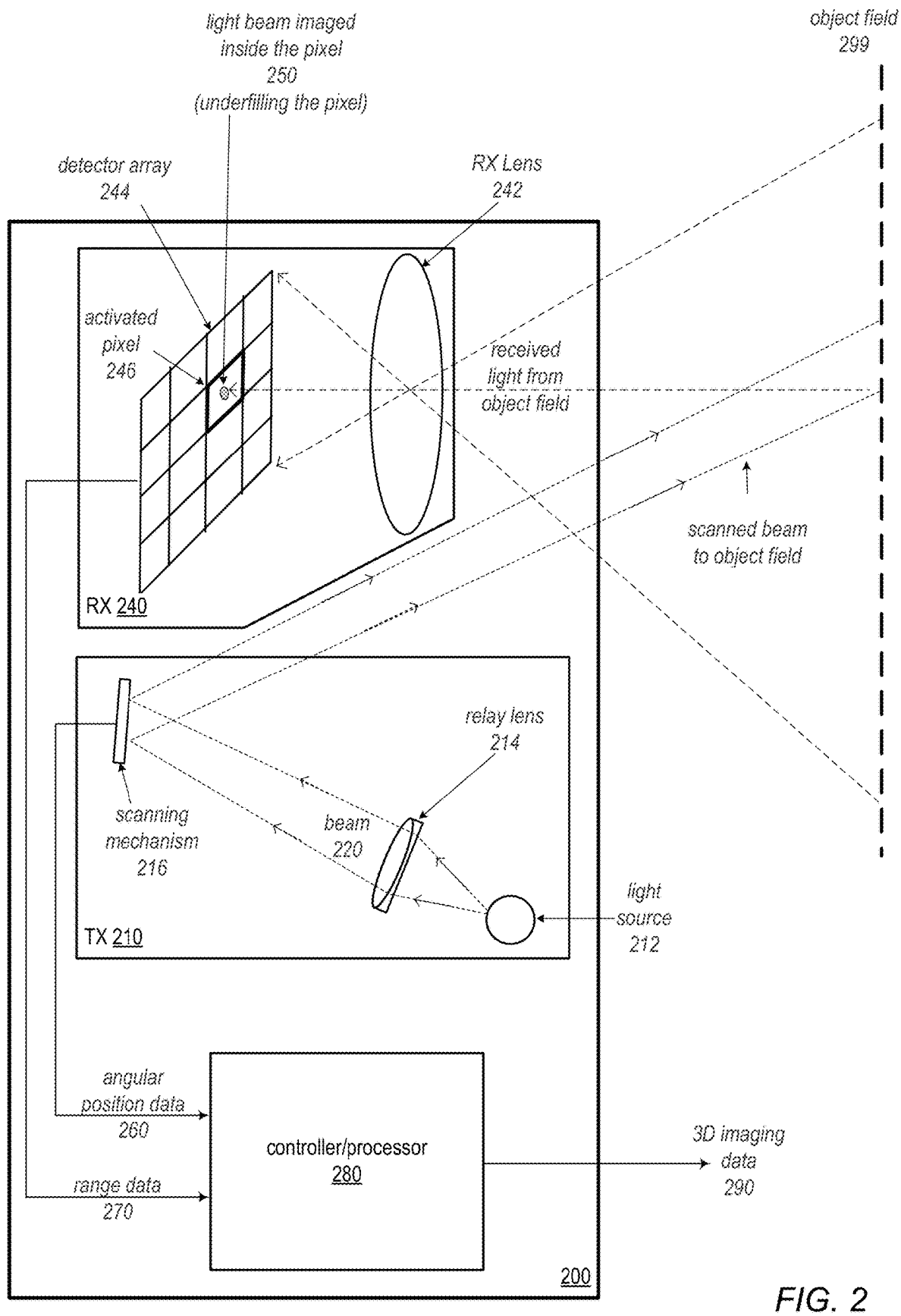
FIG. 2 conceptually illustrates components and operations of a remote sensing device in which the return beam is scanned and imaged at spots inside pixels of a detector array, according to some embodiments.

FIG. 2 conceptually illustrates components and operations of a remote sensing device in which the return beam is scanned and imaged at spots inside pixels of a detector array, according to some embodiments. The remote sensing device 200 may include, but is not limited to, a transmit (TX) 210 component or module and a receive (RX) 240 component or module. In some embodiments, TX 210 may also include a controller/processor 280 component or module. TX 210 may include, but is not limited to, a light source 212 and a scanning mechanism 216. TX 210 may also include a relay lens 214. While not shown in FIG. 2, TX 210 may also include an RX lens as shown in FIG. 1A, 4A, or 4B. RX 240 may include, but is not limited to, an RX lens 242 and a detector array 244.

A scene (the object field 299) is scanned by scanning mechanism 216 according to a pattern with a collimated, narrow beam 220 emitted from light source 212. The beam 220 strikes objects/surfaces in the object field 299 and is returned to the RX 240, where the return beam scans across the object-side surface of the detector array 244. Pixels of the detector array are activated according to the current scan angle of the beam 220. The beam 220 may be scanned and captured at multiple spots 250 (or sub-pixels) within each pixel of the detector array 244. Controller/processor 280 may determine angular (XY) position from feedback 260 of the scanning mechanism 216, and may determine depth or range (Z) position from feedback 270 from the detector array 244. The angular and depth position information may be processed by controller/processor 280 to generate 3D imaging data 290 as output.

Figure 3:
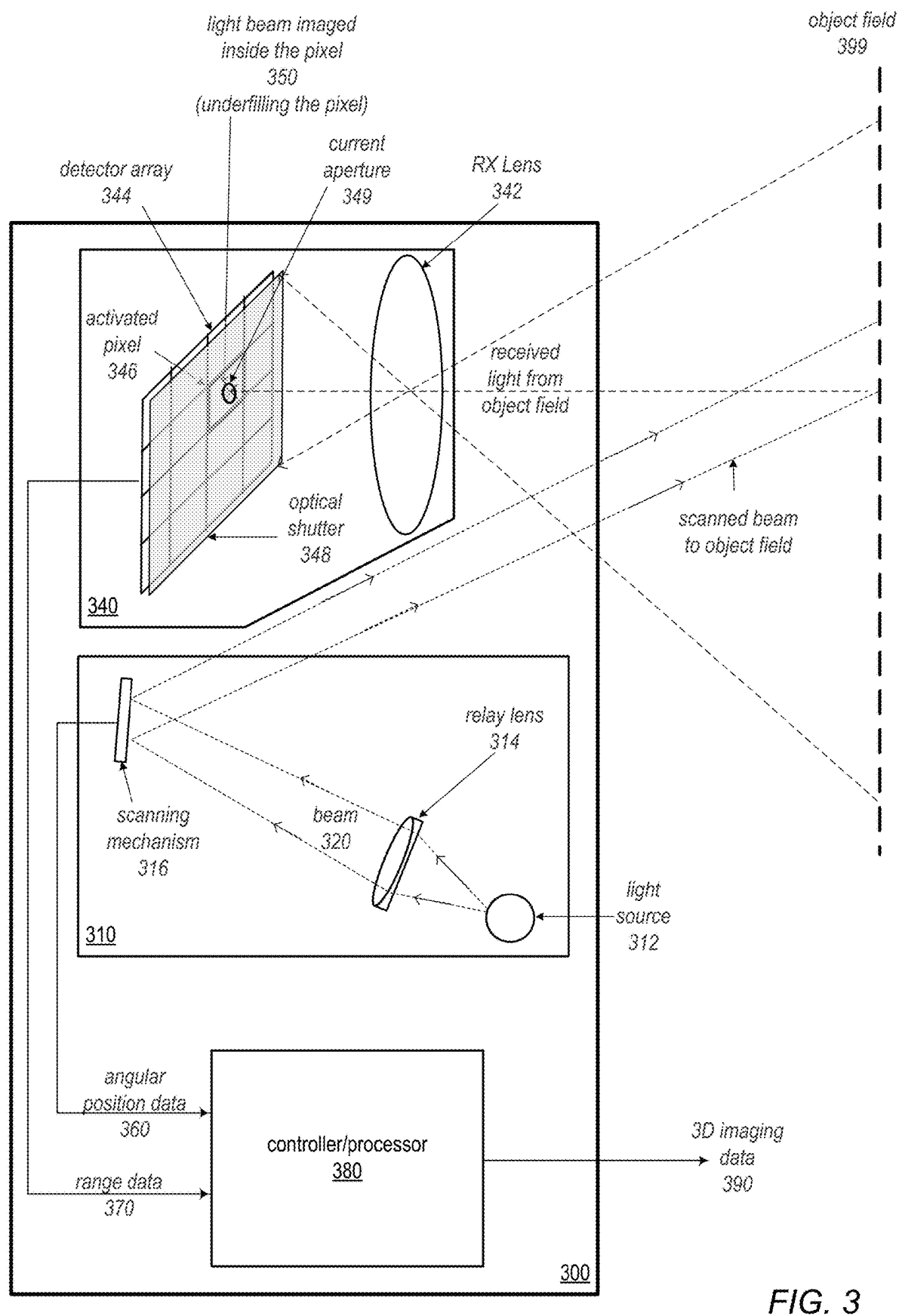
FIG. 3 conceptually illustrates operations of a remote sensing device in which the return beam is scanned and imaged at spots inside pixels of a detector array and that includes an optical shutter mechanism, according to some embodiments.

FIG. 3 conceptually illustrates operations of a remote sensing device in which the return beam is scanned and imaged at spots inside pixels of a detector array and that includes an optical shutter mechanism, according to some embodiments. The remote sensing device 300 may include, but is not limited to, a transmit (TX) 310 component or module and a receive (RX) 340 component or module. In some embodiments, TX 310 may also include a controller/processor 380 component or module. TX 310 may include, but is not limited to, a light source 312 and a scanning mechanism 216. TX 310 may also include a relay lens 314. While not shown in FIG. 3, TX 2310 may also include an RX lens as shown in FIG. 1A, 4A, or 4B. RX 340 may include, but is not limited to, an RX lens 342 and a detector array 344. RX 140 may also include an optical shutter 348 located at or near the object field side surface of the detector array 344 and in the optical path of the receiver 340 between the RX lens 342 and the detector array 344. The optical shutter 348 may act to block unwanted noise (e.g., unwanted light such as ambient solar light) from the spots 350 on the pixels when scanning the beam 320 over the FOV. In some embodiments, the optical shutter 348 may provide a moving aperture 349 of substantially the same size as the beam 320/spot 350 that moves according to the scan pattern of the beam 320. The optical shutter 348 may, for example, be implemented by liquid crystal technology at or on the object-side surface of the detector array 344.

A scene (the object field 299) is scanned by scanning mechanism 216 according to a pattern with a collimated, narrow beam 220 emitted from light source 212. The beam 220 strikes objects/surfaces in the object field 299 and is returned to the RX 240, where the return beam passes through the current aperture 249 of the optical shutter as it scans across the object-side surface of the detector array 344. Pixels of the detector array are activated according to the current scan angle of the beam 320; the aperture 249 is also moved according to the current scan angle within the activated pixels. The beam 320 may be scanned and captured at multiple spots 350 (or sub-pixels) within each pixel of the detector array 344. Controller/processor 380 may determine angular (XY) position from feedback 360 of the scanning mechanism 316, and may determine depth or range (Z) position from feedback 370 from the detector array 344. The angular and depth position information may be processed by controller/processor 380 to generate 3D imaging data 290 as output.

FIG. 4A illustrates an example transmit (TX) module of a remote sensing device, according to some embodiments. A transmit (TX) 410A component of a remote sensing device as illustrated in FIGS. 1A through 3 may include, but is not limited to, a light source 412 and a scanning mechanism 416. TX 410 may also include a relay lens 414 and a TX lens 415. Light source 412 may, for example, be a laser that emits a collimated, narrow beam 420. In some embodiments, multiple lasers with different attack angles may be used to increase the scanning mechanism 416 FOV without impacting the scanner's mechanical motion. Relay lens 414 may include one or more refractive lens elements, and may act to refract light (beam 420) emitted by the light source 412 on the optical path to the scanning mechanism 416. Scanning mechanism 416 may be or may include a small, fast scanning mechanism such as a MEMS (microelectromechanical system) mirror or mirror array or a piezo mirror that scans the collimated, narrow beam 420 of light emitted by the light source 412 across a field of view (FOV). TX lens 415 may include one or more refractive lens elements, and may act to refract light (scanned beam 420) from the scanning mechanism 416 on the optical path to the object field. The TX lens 415 shown in FIG. 4A does not provide angular magnification for the scanned beam 420.

FIG. 4B illustrates a TX module of a remote sensing device that provides angular magnification, according to some embodiments. A transmit (TX) 410B component of a remote sensing device as illustrated in FIGS. 1A through 3 may include, but is not limited to, a light source 412 and a scanning mechanism 416. TX 410 may also include a relay lens 414 and a TX lens 417. Light source 412 may, for example, be a laser that emits a collimated, narrow beam 420. In some embodiments, multiple lasers with different attack angles may be used to increase the scanning mechanism 414 FOV without impacting the scanner's mechanical motion. Relay lens 414 may include one or more refractive lens elements, and may act to refract light (beam 420) emitted by the light source 412 on the optical path to the scanning mechanism 416. Scanning mechanism 416 may be or may include a small, fast scanning mechanism such as a MEMS (microelectromechanical system) mirror or mirror array or a piezo mirror that scans the collimated, narrow beam 420 of light emitted by the light source 412 across a field of view (FOV). TX lens 417 may include one or more refractive lens elements, and may act to refract light (scanned beam 420) from the scanning mechanism 416 on the optical path to the object field. The TX lens 417 shown in FIG. 4B provides angular magnification for the scanned beam 420, for example using one or more lenses with negative refractive power (lenses 2 and 3 in FIG. 4B) to effectively increase the FOV of the scanning mechanism 416 without affecting motion, size, or other aspects of the scanning mechanism 416.

Figure 5A:
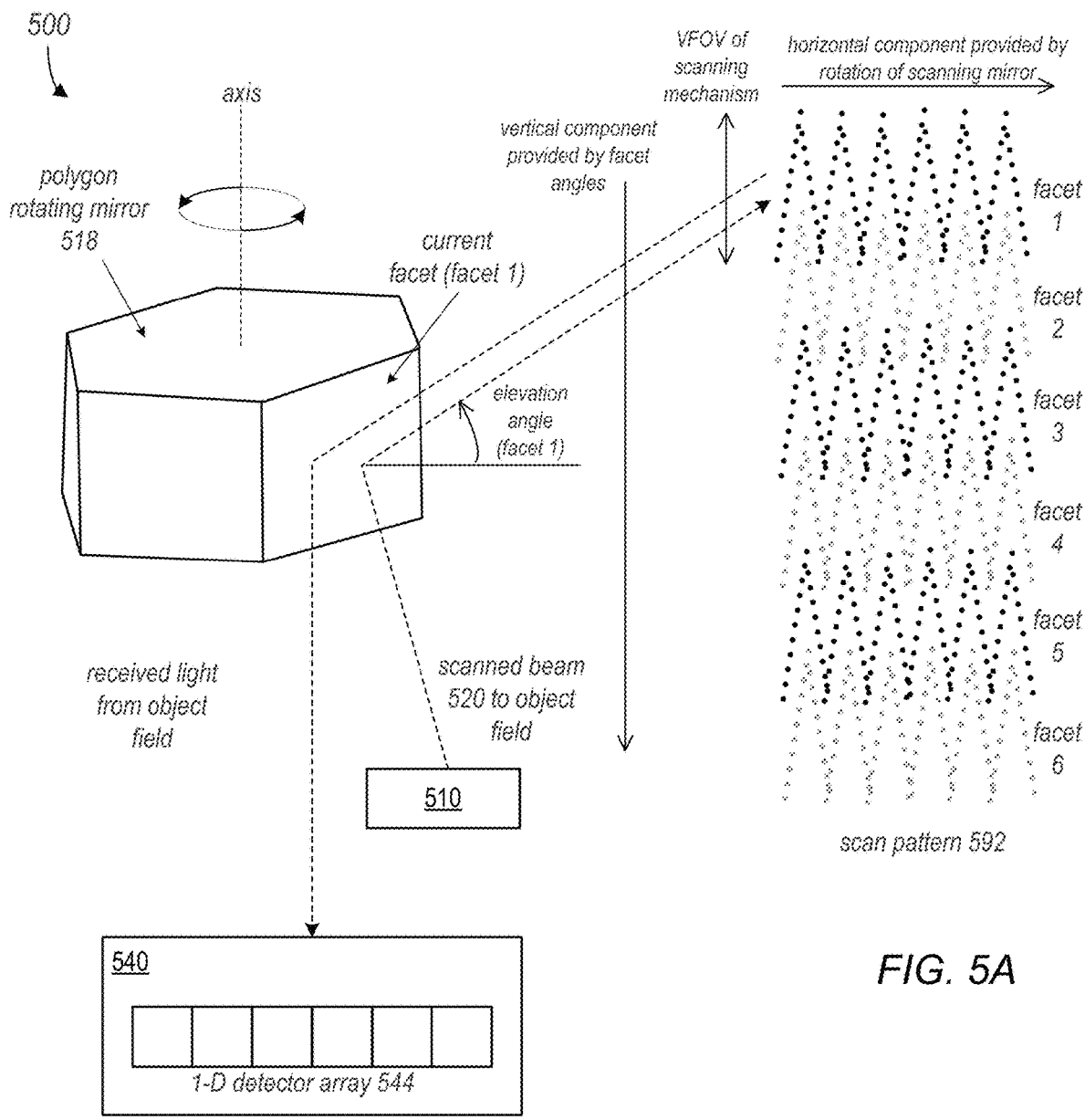
FIG. 5A illustrates a remote sensing device that includes a polygon rotating mirror, according to some embodiments.
Figure 5B:
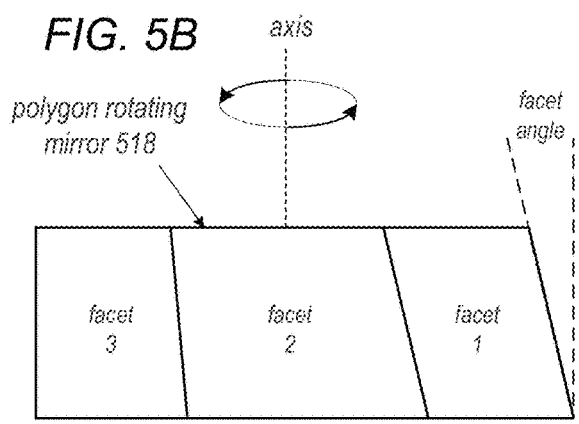
FIG. 5B illustrates a facet angle of an example facet on a polygon rotating mirror, according to some embodiments.

FIG. 5A illustrates a remote sensing device 500 that includes a polygon rotating mirror, according to some embodiments. In these embodiments, a scanning mechanism with a limited vertical field of view (VFOV), for example $\frac{1}{6}^{th}$ of the desired vertical dimension of the object field to be scanned, may be used in transmit (TX) component 510, and a polygon rotating mirror 518 with N facets (e.g., six facets in this example), each facet with a different facet angle, may be used to increase the VFOV of the scanning mechanism. FIG. 5B illustrates a facet angle of an example facet (facet 1) on a polygon rotating mirror 518. Each facet angle corresponds to a different elevation angle for an object field being scanned, as shown by scan pattern 592 of FIG. 5A. In some embodiments, the scanning mechanism may be a one-dimensional scanning mirror that scans the beam in one dimension (e.g., the vertical dimension or axis). The increased vertical component of the scan pattern 592 may be provided by the facet angles of the rotating mirror 518, and the horizontal component of the scan pattern 592 may be provided by the rotation of the mirror 518. In some embodiments, the detector array 544 of receive (RX) component 540 may be a one-dimensional (1D) array of pixels with a FOV corresponding to the scanning mechanism. Each pixel FOV (PFOV) may be significantly larger than the size of the beam 520 received at the detector array 544. The beam 520 may be scanned and captured at multiple spots (or sub-pixels) within the pixels of the detector array 544. Pixels on the detector array 544 may be activated (or deactivated) according to the current scan angle of the beam 520.

In the remote sensing device 500 as illustrated in FIG. 5A, depth or range (Z) position may be calculated from feedback from currently activated pixels of the detector array 544. The horizontal (X) angle may be determined based on the encoder angle from the polygon rotating mirror 518. The vertical (Y) angle may be determined based on feedback from the 1D scanning mechanism in combination with the current facet number of the polygon rotating mirror 518. The angular and depth position information may be processed by a controller/processor component (not shown) to generate 3D imaging data as output.

Figure 6:
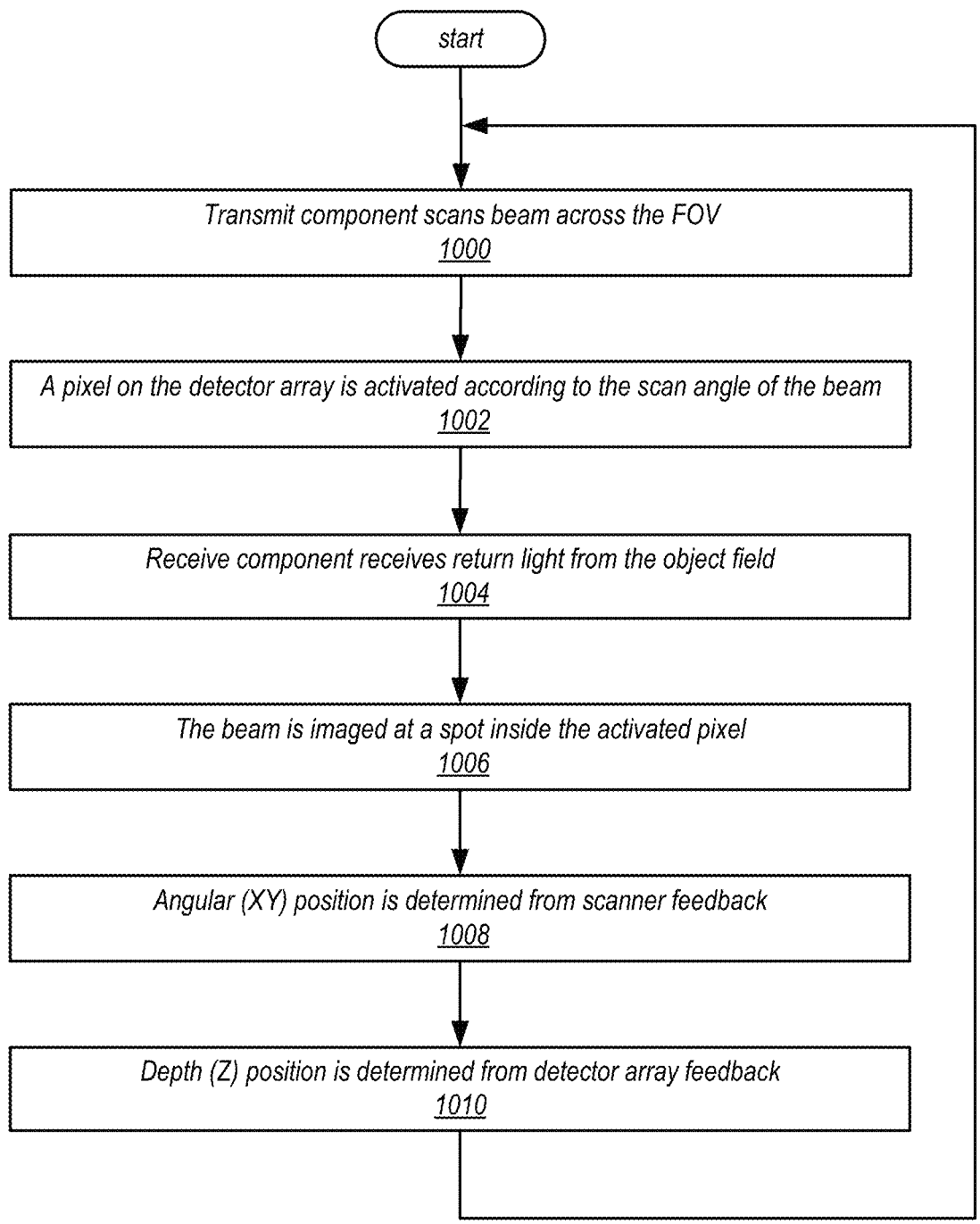
FIG. 6 is a high-level flowchart of a method of operation of a remote sensing device, according to some embodiments.

FIG. 6 is a high-level flowchart of a method of operation of a remote sensing device, according to some embodiments. The method of FIG. 6 may, for example, be implemented by a remote sensing device as illustrated in FIGS. 1A through 5.

As indicated at 1000, a transmit component of the remote sensing device scans a beam of light across a FOV at an object field. For example, the beam may be a collimated, narrow beam emitted from a light source such as one or more lasers. The FOV may, for example, be scanned according to a scan pattern by a scanning mechanism as illustrated in FIG. 1D. The scanning mechanism may be a small, fast scanning mechanism such as a MEMS (microelectromechanical system) mirror or mirror array or a piezo mirror.

As indicated at 1002, a pixel on a detector array of a receive component of the remote sensing device may be activated according to the scan angle of the beam. FIG. 1B illustrates a detector array of a remote sensing device, according to at least some embodiments. The detector array may provide a FOV at least large enough to capture the full FOV of the scanning mechanism.

As indicated at 1004, the receive component of the remote sensing device receives return light from the object field. As indicated at 1006, the beam returned from the object field is imaged, for example by an RX lens as illustrated in FIGS. 1A, 2, and 3, at a spot inside the currently activated pixel. As shown in FIG. 1B, the detector array may be relatively low resolution when compared to the scanning mechanism, with fewer pixels than the resolution of the scanning mechanism. Each pixel FOV (PFOV) may be significantly larger than the size of the beam received at the detector array. The beam may be captured at a spot (or sub-pixel) within the activated pixel of the detector array, for example as illustrated in FIG. 2.

As indicated at 1008, angular (XY) position is determined from feedback from the scanning mechanism. As indicated at 1010, depth (Z) position is determined from feedback from the detector array. The position information may be processed to generate 3D imaging data output.

Figure 7:
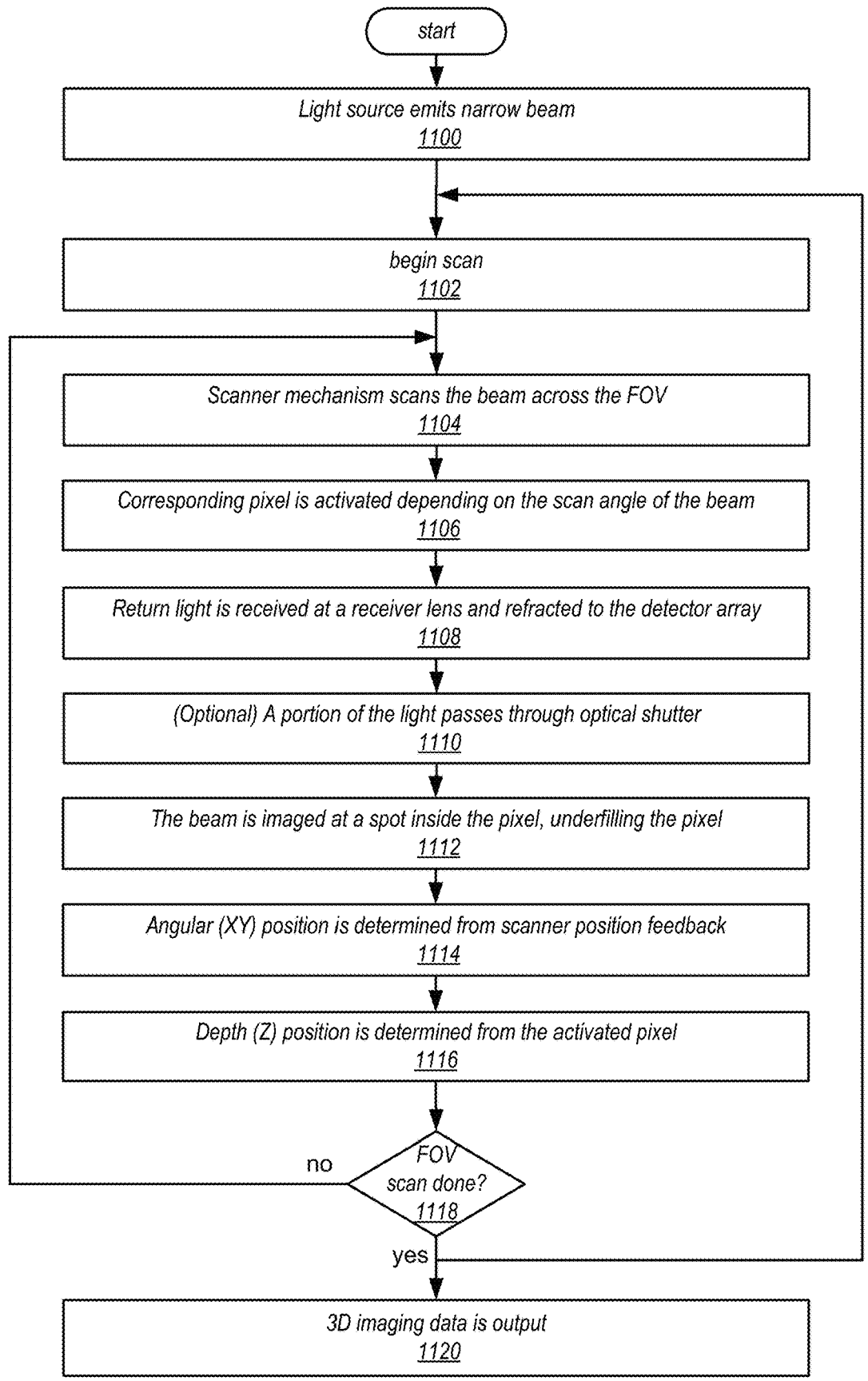
FIG. 7 is a more detailed flowchart of a method of operation of a remote sensing device, according to some embodiments.

FIG. 7 is a more detailed flowchart of a method of operation of a remote sensing device, according to some embodiments. The method of FIG. 6 may, for example, be implemented by a remote sensing device as illustrated in FIGS. 1A through 3.

As indicated at 1100, a light source of a transmit component of the remote sensing device emits a beam of light. For example, the beam may be a collimated, narrow beam emitted from a light source such as one or more lasers. In some embodiments, the light source may continuously emit the beam during the scan method of elements 1102-1118.

As indicated at 1102, the remote sensing device may begin a scan of a field of view (FOV) at an object field. The FOV may, for example, be scanned according to a scan pattern as illustrated in FIG. 1D.

As indicated at 1104, a scanning mechanism of the transmit component scans the beam across the FOV. The scanning mechanism may be a small, fast scanning mechanism such as a MEMS (microelectromechanical system) mirror or mirror array or a piezo mirror.

As indicated at 1106, a corresponding pixel on a detector array of a receive component of the remote sensing device may be activated according to the current scan angle of the scanning mechanism. FIG. 1B illustrates a detector array of a remote sensing device, according to at least some embodiments. The detector array may provide a FOV at least large enough to capture the full FOV of the scanning mechanism. As indicated at 1108, return light from the object field is received at a receiver lens of the receive component. The receiver lens refracts the light to the detector array.

In some embodiments as shown in FIG. 1C, the receive component may include an optical shutter located in the optical receiver path between the receiver lens and the detector array at or near the object field side surface of the detector array that acts to block unwanted light. In some embodiments, the optical shutter may provide a moving aperture of substantially the same size as the beam that moves according to the scan pattern of the beam. The optical shutter may, for example, be implemented by liquid crystal technology at or on the object-side surface of the detector array. In these embodiments, as indicated at 1110, a portion of the light passes through a current aperture of the optical shutter, with unwanted light being blocked by the aperture.

In some embodiments, an optical band-pass filter may instead or also be included on the optical receiver path between the receiver lens and the detector array to attenuate or reject light outside of a range of the beam.

As indicated at 1112, the beam is imaged at a spot inside the currently activated pixel, underfilling the pixel. As shown in FIG. 1B, the detector array may be relatively low resolution when compared to the scanning mechanism, with fewer pixels than the resolution of the scanning mechanism. Each pixel FOV (PFOV) may be significantly larger than the size of the beam received at the detector array. The beam may be captured at a spot (or sub-pixel) within the activated pixel of the detector array, for example as illustrated in FIG. 2.

As indicated at 1114, the angular (XY) position information for the imaged beam may be determined from feedback from the scanning mechanism indicating the current scan angle. As indicated at 1116, depth (Z) position for the imaged beam may be determined from feedback from the currently activated pixel of the detector array.

At 1118, if the current FOV scan of the object field is not done, then the method returns to element 1102 to continue the scan. Otherwise, if the current FOV scan of the object field is done, then the method may return to element 1102 to begin a next scan, and the position information collected for the FOV scan may be processed to generate 3D imaging data output for the FOV scan as indicated at 1120.

Figure 8:
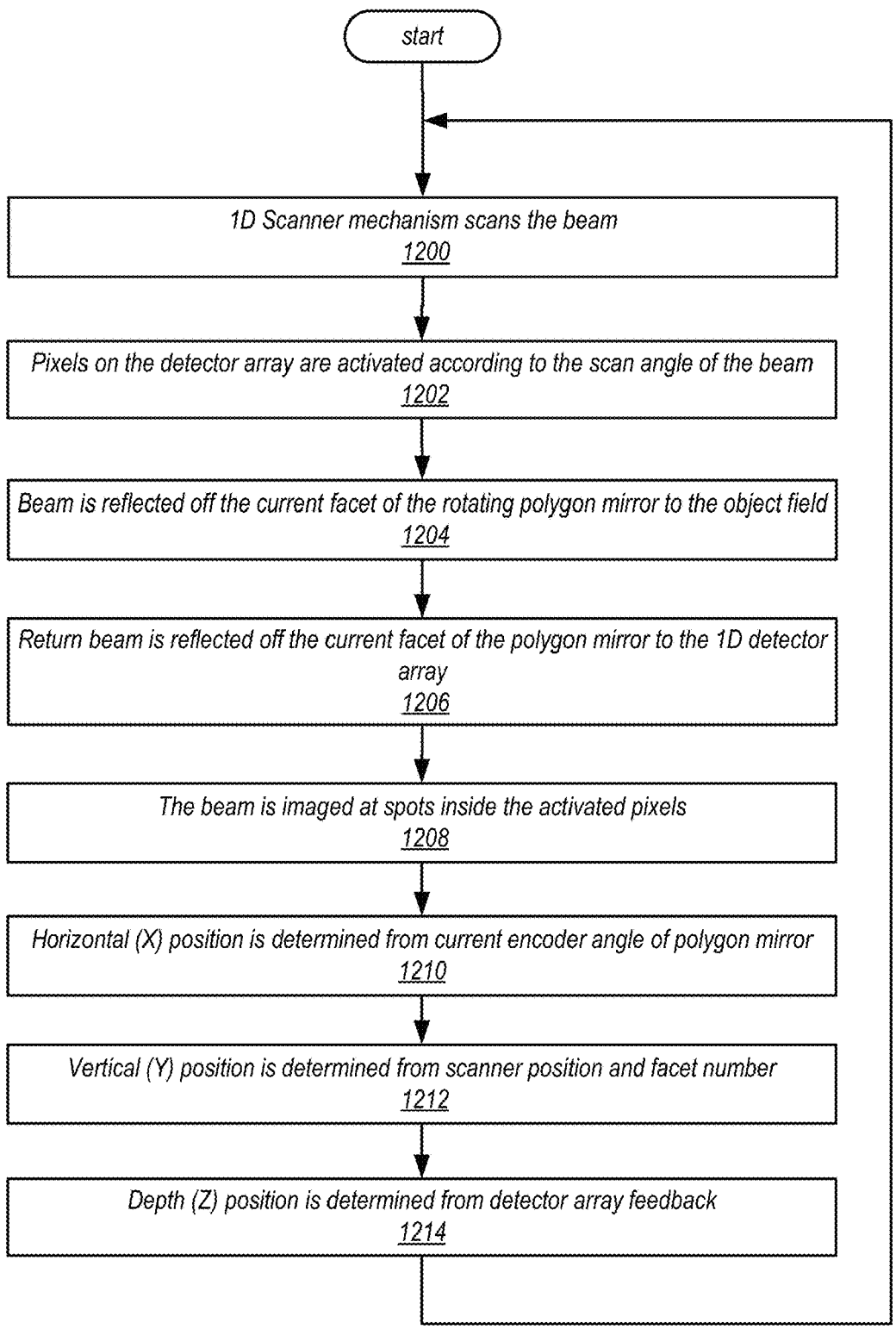
FIG. 8 is a flowchart of a method of operation of a remote sensing device that includes a polygon rotating mirror, according to some embodiments.

FIG. 8 is a flowchart of a method of operation of a remote sensing device that includes a polygon rotating mirror, according to some embodiments. The method of FIG. 6 may, for example, be implemented by a remote sensing device as illustrated in FIG. 5A.

As indicated at 1200, a scanning mechanism of the remote sensing device scans a beam emitted from a light source such as one or more lasers. In some embodiments, the scanning mechanism may be a one-dimensional scanning mirror that scans the beam in one dimension (e.g., the vertical dimension or axis). In some embodiments, a scanning mechanism with a limited vertical field of view (VFOV) may be used.

As indicated at 1202, a pixel on the detector array are activated according to the current scan angle of the beam. In some embodiments, the detector array may be a one-dimensional array of pixels with a FOV corresponding to the scanning mechanism. Each pixel FOV (PFOV) may be significantly larger than the size of the beam. The beam may be scanned and captured at multiple spots (or sub-pixels) within the pixels of the detector array.

As indicated at 1204, the beam is reflected off a current facet of a rotating polygon mirror to the object field. A polygon rotating mirror with N facets (e.g., five facets, six facets, etc.), each facet with a different facet angle, may be used to increase the VFOV of the scanning mechanism. Each facet corresponds to a different elevation angle. The horizontal component of the scan pattern may be provided by the polygon rotating mirror as it rotates.

As indicated at 1206, the return beam from the object field is reflected off the current facet of the polygon mirror to the 1D detector array. As indicated at 1208, the beam is imaged at spots inside the activated pixel.

As indicated at 1210, horizontal (X) position may be determined from the current encoder angle of the polygon rotating mirror. As indicated at 1212, vertical (Y) position may be determined from the scanning mechanism position/angle and the current facet number of the polygon rotating mirror. As indicated at 1214, depth or range (Z) position may be determined from feedback from the currently activated pixel of the detector array. The position information may be processed to generate 3D imaging data output.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A remote sensing device, comprising:
a light source configured to emit a beam of light;
a scanning mechanism configured to scan the beam, at a resolution of the scanning mechanism, across a field of view (FOV) to an object field;
a detector array comprising a plurality of pixels, wherein a resolution of the detector array in pixels is less than the resolution of the scanning mechanism; and
a controller configured to:
collect a plurality of values of a pixel of the plurality of pixels of the detector array at different positions of the scanned beam; and
generate, based in part on the plurality of values, imaging data for at least a portion of the FOV at a resolution greater than the resolution of the detector array.

2. The remote sensing device as recited in claim 1, wherein the light source comprises one or more lasers.

3. The remote sensing device as recited in claim 1, wherein the remote sensing device is configured to:
determine angular position data from feedback of the scanning mechanism;
determine range data from feedback of the detector array; and
generate three-dimensional (3D) imaging data for the object field according to the angular position data and the range data.

4. The remote sensing device as recited in claim 1, further comprising a receive lens that receives light from the object field and refracts the received light to the detector array.

5. The remote sensing device as recited in claim 4, further comprising an optical shutter located on an optical path between the receive lens and the detector array, wherein the optical shutter provides a moving aperture configured to block a portion of the light received from the receive lens when imaging and capturing the scanned beam at a spot within an activated pixel of the detector array.

6. The remote sensing device as recited in claim 4, further comprising an optical filter located on an optical path between the receive lens and the detector array and configured to attenuate or reject light outside of a spectral range of the scanned beam.

7. The remote sensing device as recited in claim 1, further comprising a transmit lens that refracts the scanned beam from the scanning mechanism on an optical path to the object field.

8. The remote sensing device as recited in claim 7, wherein the transmit lens is configured to provide angular magnification for the scanned beam to increase the FOV of the scanning mechanism.

9. The remote sensing device as recited in claim 1, further comprising a polygon rotating mirror with N facets, each facet with a different facet angle, wherein the polygon rotating mirror is configured to increase vertical FOV of the scanning mechanism.

10. The remote sensing device as recited in claim 9, wherein the scanning mechanism includes a one-dimensional scanning mirror, and wherein the detector array is a one-dimensional array.

11. The remote sensing device as recited in claim 9, wherein a horizontal component of a scan pattern is provided by the polygon rotating mirror as it rotates.

12. The remote sensing device as recited in claim 9, wherein the remote sensing device is configured to:
determine horizontal position data from feedback of the polygon rotating mirror;
determine vertical position data from feedback of the scanning mechanism in combination with current facet angle of one of the N facets of the polygon rotating mirror;
determine range data from feedback of the detector array; and
generate three-dimensional (3D) imaging data for the object field according to the horizontal position data, the vertical position data, and the range data.

13. The remote sensing device as recited in claim 1, wherein the scanning mechanism includes a MEMS (microelectromechanical system) mirror or a piezoelectric steering mirror.

14. The remote sensing device as recited in claim 1, wherein the detector array is implemented according to avalanche photodiode (APD) technology or PIN diode technology.

15. A method, comprising:
emitting, by one or more lasers, a beam of light;
scanning, by a scanning mechanism, the beam, at a resolution of the scanning mechanism, across a field of view (FOV) to an object field;
activating a pixel on a detector array comprising a plurality of pixels, wherein a resolution of the detector array in pixels is less than the resolution of the scanning mechanism;
collecting a plurality of values of the activated pixel at different positions of the scanned beam; and
generating imaging data for a portion of the FOV at a resolution greater than the resolution of the detector array based in part on the captured plurality of values.

16. The method as recited in claim 15, further comprising:
determining angular position data from feedback of the scanning mechanism;
determining range data from feedback of the detector array; and
generating three-dimensional (3D) imaging data for the object field according to the angular position data and the range data.

17. The method as recited in claim 15, further comprising:
receiving, by a receive lens, light from the object field; and
refracting, by the receive lens, the received light to the detector array.

18. The method in claim 17, further comprising blocking, by an optical shutter located on an optical path between the receive lens and the detector array, a portion of the light received from the receive lens when imaging and capturing the scanned beam at a spot within the activated pixel of the detector array.

19. The method as recited in claim 17, further comprising attenuating or rejecting, by an optical filter located on an optical path between the receive lens and the detector array, light outside of a spectral range of the scanned beam.

20. The method as recited in claim 15, further comprising refracting, by a transmit lens, the scanned beam from the scanning mechanism on an optical path to the object field.

21. The method as recited in claim 20, wherein the transmit lens provides angular magnification for the scanned beam to increase the FOV of the scanning mechanism.

22. The method as recited in claim 15, further comprising reflecting, by a polygon rotating mirror with a plurality of reflective facets, the scanned beam from the scanning mechanism, wherein each facet of the polygon rotating mirror has a different elevation angle to increase vertical FOV of the scanning mechanism.

23. The method as recited in claim 22, further comprising:
   determining horizontal position data from feedback of the polygon rotating mirror;
   determining vertical position data from feedback of the scanning mechanism in combination with current facet angle of one of the plurality of facets of the polygon rotating mirror;
   determining range data from feedback of the detector array; and
   generating three-dimensional (3D) imaging data for the object field according to the horizontal position data, the vertical position data, and the range data.

* * * * *